United States Patent
Yamagishi

(10) Patent No.: US 8,172,406 B2
(45) Date of Patent: May 8, 2012

(54) POWDER DUST CAPTURE DEVICE AND PROJECTION TYPE IMAGE DISPLAY DEVICE

(75) Inventor: Shigekazu Yamagishi, Osaka (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 12/524,211

(22) PCT Filed: Jan. 18, 2008

(86) PCT No.: PCT/JP2008/050635
§ 371 (c)(1),
(2), (4) Date: Jul. 23, 2009

(87) PCT Pub. No.: WO2008/090825
PCT Pub. Date: Jul. 31, 2008

(65) Prior Publication Data
US 2010/0026967 A1 Feb. 4, 2010

(30) Foreign Application Priority Data
Jan. 26, 2007 (JP) ................................. 2007-016009

(51) Int. Cl.
*G03B 21/18* (2006.01)
*G03B 21/26* (2006.01)
*G03B 21/14* (2006.01)
*B01D 24/28* (2006.01)
*B01D 35/00* (2006.01)

(52) U.S. Cl. ............ 353/61; 353/57; 353/119; 210/780; 210/107

(58) Field of Classification Search ............... 353/61, 353/57, 119; 96/54; 210/780, 107
See application file for complete search history.

(56) References Cited

U.S. PATENT DOCUMENTS
3,841,840 A * 10/1974 Hundhausen et al. ........ 422/180
2005/0150382 A1 7/2005 Sheehan et al.

FOREIGN PATENT DOCUMENTS
| JP | 5-049830 A | 3/1993 |
| JP | 5-057120 A | 3/1993 |
| JP | 06134027 A * | 5/1994 |
| JP | 6-269696 A | 9/1994 |
| JP | 8-128400 | 5/1996 |
| JP | 2006-150237 A | 6/2006 |
| WO | WO 2005/070056 A2 | 8/2005 |

* cited by examiner

*Primary Examiner* — Georgia Y Epps
*Assistant Examiner* — Magda Cruz
(74) *Attorney, Agent, or Firm* — Hamre, Schumann, Mueller & Larson, P.C.

(57) ABSTRACT

A powder dust capture device includes a main body housing having an air intake in which a powder dust capture unit is provided, and a blowing unit for drawing air in from the air intake via the powder dust capture unit, passing the air through a predetermined area, and expelling the air out from an exhaust. The powder dust capture unit includes a filter unit with an electrostatic filter wound around a roller shaft, a filter take-up shaft, a filter feeding mechanism and a filter feed control unit. The filter unit is attachable/removable with respect to the main body housing. The filter feed control unit has a filter feed amount detection unit, and controls a filter feeding operation performed by the filter feeding mechanism, based on detection output from the filter feed amount detection unit.

22 Claims, 7 Drawing Sheets

POWDER DUST CAPTURE DEVICE AND PROJECTION TYPE IMAGE DISPLAY DEVICE

TECHNICAL FIELD

The present invention relates to a powder dust capture device including an electrostatic filter, and in particular to a powder dust capture device having a function of automatically refreshing a used electrostatic filter, and a projection type image display device including the powder dust capture device.

BACKGROUND ART

Conventionally, projection type image display devices such as projectors focus intense light from a light source onto an image display element such as a liquid crystal panel or DMD (Digital Mirror Device), so as to perform modulation in accordance with an image signal, and enlarge and project an image formed on the image display element, thereby obtaining a high-resolution large screen.

In such projection type image display devices, the imaging element exposed to intense light, the light source, a device power source, etc. generate a large amount of heat, and the absence of appropriate cooling not only influences image quality, but also causes thermal breakdown. For this reason, projection type image display devices have a structure in which air is drawn into the device by a fan to cool the device interior.

However, powder dust is drawn in along with the air from outside the device, and the attachment of such powder dust to the image display device and light source periphery causes a reduction in brightness and color irregularities.

For this reason, a filter for preventing the intake of powder dust is disposed in an air intake, and in the case of a mainstream urethane filter, filter cleaning is required every several hundred hours. Also, although a urethane filter physically captures powder dust in small apertures to prevent intake, powder dust whose size falls below 10 μm cannot be blocked. The intake of microparticles such as yellow sand and tobacco smoke therefore cannot be prevented.

On the other hand, in an electrostatic filter, even small-sized dust can be captured since powder dust is trapped by static electricity, and a large loss in pressure is suppressed since the apertures are large. However, when the capturing capability is exceeded, the effect of the static electricity no longer can be obtained, and powder dust enters the device interior instead of being captured. Also, an electrostatic filter cannot be cleaned, and replacement with a new product is required every several hundred hours.

However, projection type image display devices are often for ceiling-mounted use, so that maintenance is difficult because of an installation condition in which filter replacement cannot be performed easily. In view of the same problem, there are known, for example, air-cleaning devices having structures such as the following.

For example, Patent Document 1 discloses an ozone deodorization device having a structure in which an electrostatic filter is formed into a long belt and windably provided between two rotating rollers, and the electrostatic filter is wound automatically by a motor according to the operating time of the device. This structure enables using an electrostatic filter for a long time without replacement with a new product. The application of this device to a projector is considered to be able to extend the filter replacement time.

Also, Patent Document 2 discloses a similar structure in an air-cleaning device, in which an unused-filter storage unit and a used-filter storage unit are integrated in a cassette that can be opened with the provision of a hinge.
Patent Document 1: JP H5-49830A
Patent Document 2: JP H6-269696A

DISCLOSURE OF INVENTION

Problem to be Solved by the Invention

In the ozone deodorization device disclosed in Patent Document 1, filter feeding is performed by driving a reeling motor for a given time every time a predetermined operation time has elapsed, based on a timer that measures a deodorization operation time and ROM data that records operation conditions. In the case of this structure, there is no problem as long as the electrostatic filter is not replaced. However, if it is necessary for the electrostatic filter to be replaced, there is a large difference in the amount of filter that is fed by one rotation of the take-up shaft at the beginning and end of using the electrostatic filter, and therefore keeping the filter feed amount constant requires detecting when the filter has been replaced.

On the other hand, eliminating the need to replace the electrostatic filter requires a capacity for storing enough of the filter to ensure the device lifetime.

Also, although a method of replacing the electrostatic filter is not mentioned, in the structures disclosed in Patent Documents 1 and 2, there is a danger that powder dust that has attached to the electrostatic filter may break away during replacement and again scatter inside the device.

An object of the present invention is to provide a powder dust capture device in which an electrostatic filter can be used for a long time, a time for replacement can be detected accurately, replacement is simple, and furthermore, there is no danger of once-attached powder dust again scattering outside.

Another object of the present invention is to provide a projection type image display device including the powder dust capture device.

Means for Solving Problem

A powder dust capture device of the present invention includes: a main body housing having an air intake and an exhaust; a powder dust capture unit provided in the air intake; and a blowing unit for drawing air in from the air intake via the powder dust capture unit, passing the air through a predetermined area in the main body housing, and expelling the air out from the exhaust.

The powder dust capture unit includes a filter unit, a filter feeding mechanism and a filter feed control unit. The filter unit includes an electrostatic filter wound around a rolling shaft, a filter take-up shaft that reels in the electrostatic filter, a coupling unit for engaging the filter take-up shaft to the filter feeding mechanism, and a small housing that stores the electrostatic filter wound around the rolling shaft and the filter take-up shaft. The small housing has an aperture part between the rolling shaft and the filter take-up shaft for drawing in air that has passed through the electrostatic filter from the air intake. The filter feeding mechanism can perform driving to rotate the filter take-up shaft via coupling with the filter take-up shaft by engagement with the coupling unit. The filter feed control unit has a filter feed amount detection unit and controls a filter feeding operation performed by the filter feeding mechanism, based on detection output from the filter feed amount detection unit. The filter unit is attachable/removable with respect to the main body housing.

A projection type image display device of the present invention includes: a light source; an image display element that modulates incident light; a projection optical system that causes light from the light source to incident on the image display element and projects an image obtained by the modulation performed by the image display element; a power source unit; a main body housing storing the light source, the image display element, the projection optical system, and the power source unit, and having an air intake and an exhaust; a powder dust capture unit provided in the air intake; and a blowing unit for drawing air in from the air intake via the powder dust capture unit, passing the air through a predetermined area in the main body housing, and expelling the air out from the exhaust. This powder dust capture unit has the same structure as the powder dust capture unit described above.

Effects of the Invention

According to the present invention, even minute powder dust can be removed by an electrostatic filter, and even when used for a long time, the filter is automatically refreshed as appropriate, thereby constantly keeping the filter in a favorable condition, which enables powder dust removal performance to be maintained for a long time without causing maintenance management to be troublesome.

Figure 1:
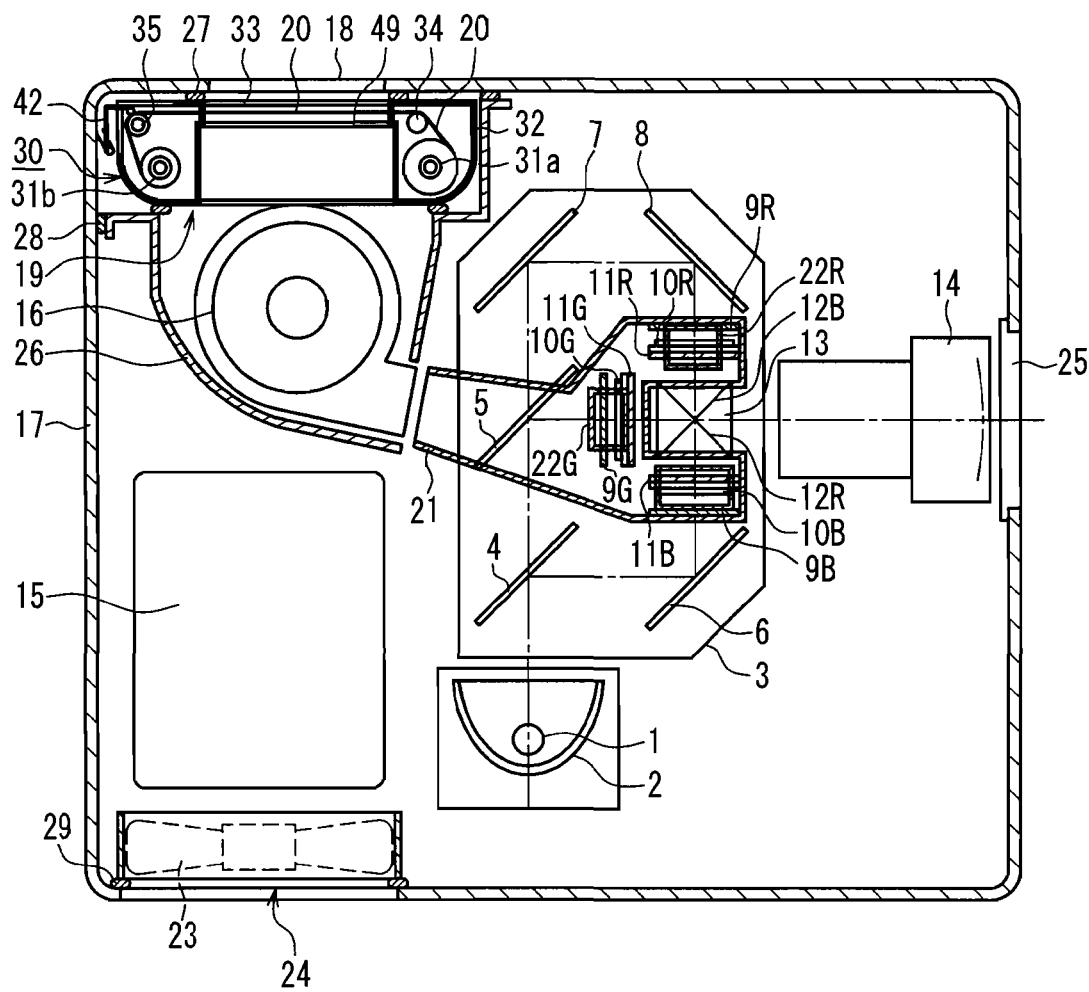
FIG. 1 is a sectional view showing a structure of a projection type image display device in Embodiment 1 of the present invention.

DESCRIPTION OF THE REFERENCE SIGNS 1 light source
2 reflector
3 optical unit
4, 5 dichroic mirror
6, 7, 8 total reflection mirror
9R, 9G, 9B incident-side polarizer
10R, 10G, 10B liquid crystal panel
11R, 11G, 11B eject-side polarizer
12R, 12B dichroic reflective film
13 combine prism
14 projection lens
15 power source unit
16, 56 air intake fan
17 main body housing
17a sub-support part
17b protruding wall
18 air intake
19 powder dust capture unit
20 electrostatic filter
21 optical unit duct
21a wall face
22B aperture for blue channel
22G aperture for green channel
22R aperture for red channel
23 exhaust fan
24 exhaust
25 window part
26 air intake duct
27, 28, 29 buffer material
30 filter cassette
31a rolling shaft
31b filter take-up shaft
32 small housing
32a bottom part
33 aperture part
34 rotation relay shaft
35 feed amount monitor shaft
36 recessed coupling part
37 protruding coupling part
38 gear shaft
39 gear
40 small gear
41 stepping motor
42 pressing mechanism
43 support part
43a arm part
44 roller
45 pivot
46 bias spring
47 rotation detection reflection pattern
48 pattern detection sensor
49 fiber emanation prevention net
50 main body housing
51 barrier wall
52 first compartment
53 second compartment
54 air intake
55 input/output terminal
56 power supply unit
58 exhaust
59 partition wall
60 wall face
61 third compartment

DESCRIPTION OF THE INVENTION

The present invention can have various forms such as the following, based on the above-described structure.

For example, in the powder dust capture device having the above-described structure of the present invention, the filter feed control unit may control the filter feeding operation performed by the filter feeding mechanism so that a part of the electrostatic filter that is exposed to the aperture part is partially refreshed.

Also, it is preferable for the small housing to have an airtight structure that shields the filter take-up shaft from the outside.

Also, a fiber emanation prevention net may be affixed in a proximity of an exhaust side of the electrostatic filter. In this case, it is preferable for an aperture of a mesh in the fiber emanation prevention net to be less than or equal to 1 mm.

Also, the filter feed amount detection unit may include a feed amount monitor shaft that is rotated by running of the electrostatic filter at a time of reeling by the filter take-up shaft, and a pressing device that presses the electrostatic filter against the feed amount monitor shaft, and the feed amount monitor shaft may rotate in correspondence with a feed amount of the electrostatic filter. This enables control to keep the filter feed amount constant without using a memory such as a ROM, and enables a powder dust capture function to be maintained continuously for a long time in a housing having a limited capacity.

Also, a detection pattern may be provided on the feed amount monitor shaft for performing detection of rotation of the feed amount monitor shaft. In this case, the filter feed amount detection unit may include a rotation amount sensor that reads the detection pattern provided on the feed amount monitor shaft and detects a rotation amount of the feed amount monitor shaft.

Also, in the filter feeding mechanism, the coupling unit may be coupled with the filter take-up shaft by mounting of the filter unit to the main body housing.

Also, the pressing device may be provided on a main body housing side, and the pressing device may include an arm unit extending in a direction that regulates removal of the small housing, so that the small housing does not detach from the main body housing at a time of pressing the electrostatic filter against the feed amount monitor shaft. This enables including a function for preventing scattering from a replaceable filter without an additional part, even if the projection type image display device is mounted on the floor or ceiling-mounted so the device is inverted.

Also, the filter feed control unit may control the filter feeding mechanism so that the electrostatic filter is caused to be fed a given amount at a predetermined usage time interval.

In the projection type image display device having the above-described structure of the present invention, the filter feed control unit may control the filter feeding operation performed by the filter feeding mechanism so that a part of the electrostatic filter that is exposed to the aperture part is partially refreshed.

Also, a sealing material that does not allow air to pass may be provided between the air intake of the main body housing and the powder dust capture unit, thus forming an airtight structure.

Also, the projection type image display device further may include: in the main body housing, an inner wall that sections the internal space of the main body housing into a first compartment that stores at least the light source and the image display element and a second compartment that stores at least the power source unit, wherein in a part of the electrostatic filter that is exposed to the aperture part, air that passes through the rolling shaft side of the electrostatic filter may be guided to the first compartment, and air that passes through the filter take-up shaft side of the electrostatic filter may be guided to the second compartment.

Also, it is preferable for a storage unit that stores the electrostatic filter in the small housing to have an airtight structure with respect to the outside.

Also, an amount that the electrostatic filter is fed at a single time operation may be smaller than an aperture width for transmitting air to be guided to the first compartment.

Also, in a surface area of the electrostatic filter that is exposed to the aperture part, a surface area S1 for transmitting air to be guided to the first compartment and a surface area S2 for transmitting air to be guided to the second compartment may be set so as to satisfy the following relationship.

$$S1 \geq S2$$

Also, air that has passed through the filter and is to be guided to the first compartment and air that has passed through the filter and is to be guided to the second compartment may be respectively guided by separate exhaust fans.

Also, the projection type image display device further may include an input/output terminal and a power source input unit, wherein the input/output terminal and the power source input unit may be provided in the second compartment.

Also, the input/output terminal and the power source input unit may be stored in a third compartment that is provided separately from the first compartment and the second compartment.

Also, the projection type image display device further may include an exhaust fan shared between the first compartment and the second compartment.

The following describes a powder dust capture device and image display device in embodiments of the present invention with reference to the drawings.

Embodiment 1

FIG. 1 shows an overall structure of a projection type image display device in Embodiment 1 of the present invention. Elements pertaining to the optical structure in the present embodiment are known elements, and are described below briefly since they are not main portions of the present embodiment.

In FIG. 1, light from a light source 1 is emitted in a forward direction by a reflector 2 and is incident on an optical unit 3. The incident light is separated into red, green, and blue light by dichroic mirrors 4 and 5 and total reflection mirrors 6, 7 and 8. Thereafter, the lights of the respective colors are intensity-modulated based on an input signal (not shown) from the outside by incident-side polarizers 9R, 9G and 9B, liquid crystal panels 10R, 10G and 10B that are image display elements, and eject-side polarizers 11R, 11G and 11B. The resulting lights are synthesized onto one optical path by a combine prism 13 that includes dichroic reflective films 12R and 12B, and then incidents on a projection lens 14. The projection lens 14 is designed so as to enlarge and project images formed on the liquid crystal panels 10R, 10G and 10B onto a screen (not shown) disposed in front of the device.

At the time of this image display, displaying black requires light from the light source 1 to be absorbed by the incident-side polarizers 9R, 9G and 9B and the eject-side polarizers 11R, 11G and 11B. For this reason, these polarizers reach high temperatures. Meanwhile, due to being mainly made of organic materials, if not cooled to an appropriate temperature, the properties of these polarizers change, images cannot be controlled, and the polarizers become unusable.

Also, a cooling means is required to ensure image display quality, since the projection type image display device includes elements that self-generate large amounts of heat, such as the bulb of the light source 1 that reaches 1,000 degrees during illumination, and peripheral mechanism parts and a power source unit 15 for lighting the light source 1 and image display.

Accordingly, in the present embodiment, air (relatively low-temperature air) is guided by an air intake fan 16 that constructs a blowing unit into the device from an air intake 18 provided in a lateral face of a main body housing 17. The air drawn in by the air intake fan 16 passes through an electrostatic filter 20 of a powder dust capture unit 19 and is guided to an optical unit duct 21 disposed in close contact with a fan outlet.

An aperture for blue channel 22B, an aperture for green channel 22G and an aperture for red channel 22R are provided in the optical unit duct 21 at corresponding positions below the above-described incident-side polarizers 9R, 9G and 9B, the liquid crystal panels 10R, 10G and 10B, and the eject-side polarizers 11R, 11G and 11B.

The drawn-in air takes heat away from the incident-side polarizers 9R, 9G and 9B, the liquid crystal panels 10R, 10G and 10B, and the eject-side polarizers 11R, 11G and 11B, then is blown out from the aperture for blue channel 22B, aperture for green channel 22G and aperture for red channel 22R, and then expelled by an exhaust fan 23. Through this process, the expelled air also takes heat away from the light source 1, mechanism parts in the periphery thereof, and the power source unit 15. Air that has reached the exhaust fan 23 passes through an exhaust 24 provided in a lateral face of the main body housing 17 and is blown outside the device.

In conventional devices, powder dust from the outside was drawn in along with the air during the cooling process, and become attached to the light source unit and periphery of the light crystal panels. As a result, the luminance is deteriorated prematurely and failures such as the occurrence of color irregularities in projected images occurred. In contrast, the device of the present embodiment employs a housing structure that does not allow the intake of powder dust and a powder dust capture structure such as described below.

Employed as the housing structure that does not allow the intake of powder dust is a structure in which the projection lens 14 is completely stored in the main body housing 17 and a window part 25 is gaplessly mounted to the main housing body 17 in a light transmission part. Also, buffer materials 27, 28 and 29 that do not allow air to pass are provided between the air intake 18 and the powder dust capture unit 19, between the powder dust capture unit 19 and an air intake duct 26, and between the exhaust 24 and the exhaust fan 23, thereby sealing off the flow of air.

Employed as the powder dust capture structure is the powder dust capture unit 19 such as described below. The powder dust capture unit 19 is constituted from a filter cassette (filter unit) 30, a filter feeding mechanism (see FIG. 2, described later), and a filter feed control unit (see FIG. 3 and FIG. 4, described later).

The filter cassette 30 includes a rolling shaft 31a around which the electrostatic filter 20 is wound in a rolled-up condition and a filter take-up shaft 31b that reels in the electrostatic filter 20, and in addition to these elements, a small housing 32 that stores a coupling unit 70 (see FIG. 2, described later) for coupling with the filter feeding mechanism. The small housing 32 has an aperture part 33 between the rolling shaft 31a and the filter take-up shaft 31b, for transmitting air from the air intake 18. Also, a rotation relay shaft 34 and a feed amount monitor shaft 35 are disposed between the rolling shaft 31a and the filter take-up shaft 31b.

Figure 2:
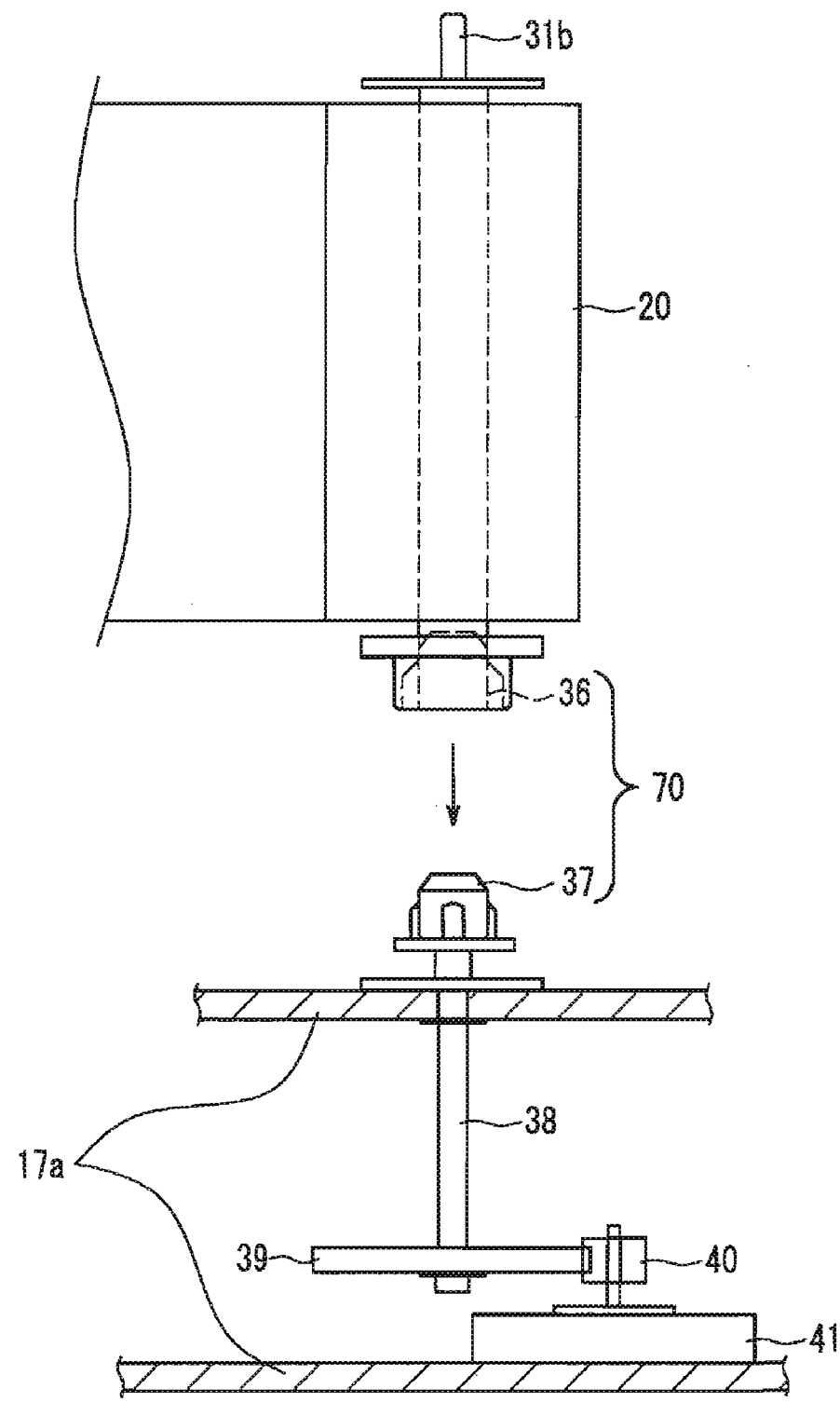
FIG. 2 is a lateral view showing a partial cross-section of a filter feeding mechanism in the projection type image display device.

The filter feeding mechanism is structured as shown in FIG. 2 and is provided on a sub-support part 17a. The sub-support part 17a may be a part of the main body housing 17 or made of a separate part fixed to the main body housing 17. The filter cassette 30 can be removed from the main body of the projection type image display device (hereinafter, called the device main body), and is coupled with the filter feeding mechanism when mounted. Note that FIG. 2 shows only the electrostatic filter 20 and the filter take-up shaft 31b in a condition of being removed from the filter cassette 30.

As shown in FIG. 2, a recessed coupling part 36 is provided on an end part of the filter take-up shaft 31b. The filter feeding mechanism has a protruding coupling part 37 that fits together with the recessed coupling part 36. The protruding coupling part 37 is provided on an end of a gear shaft 38, and a gear 39 is fixed to the other end of the gear shaft 38. The filter take-up shaft 31b and the gear shaft 38 are coupled by the recessed coupling part 36 and protruding coupling part 37 fitting together. The gear 39 is coupled with a stepping motor 41 via a small gear 40. The stepping motor 41 is controlled by a drive circuit that is not shown.

The filter feed control unit is constituted from a filter feed amount detection unit and a control circuit that is not shown. The filter feed amount detection unit is constituted from the feed amount monitor shaft 35 and a filter pressing mechanism 42 that are shown in FIG. 3 and a rotation detection unit shown in FIG. 4.

Figure 3:
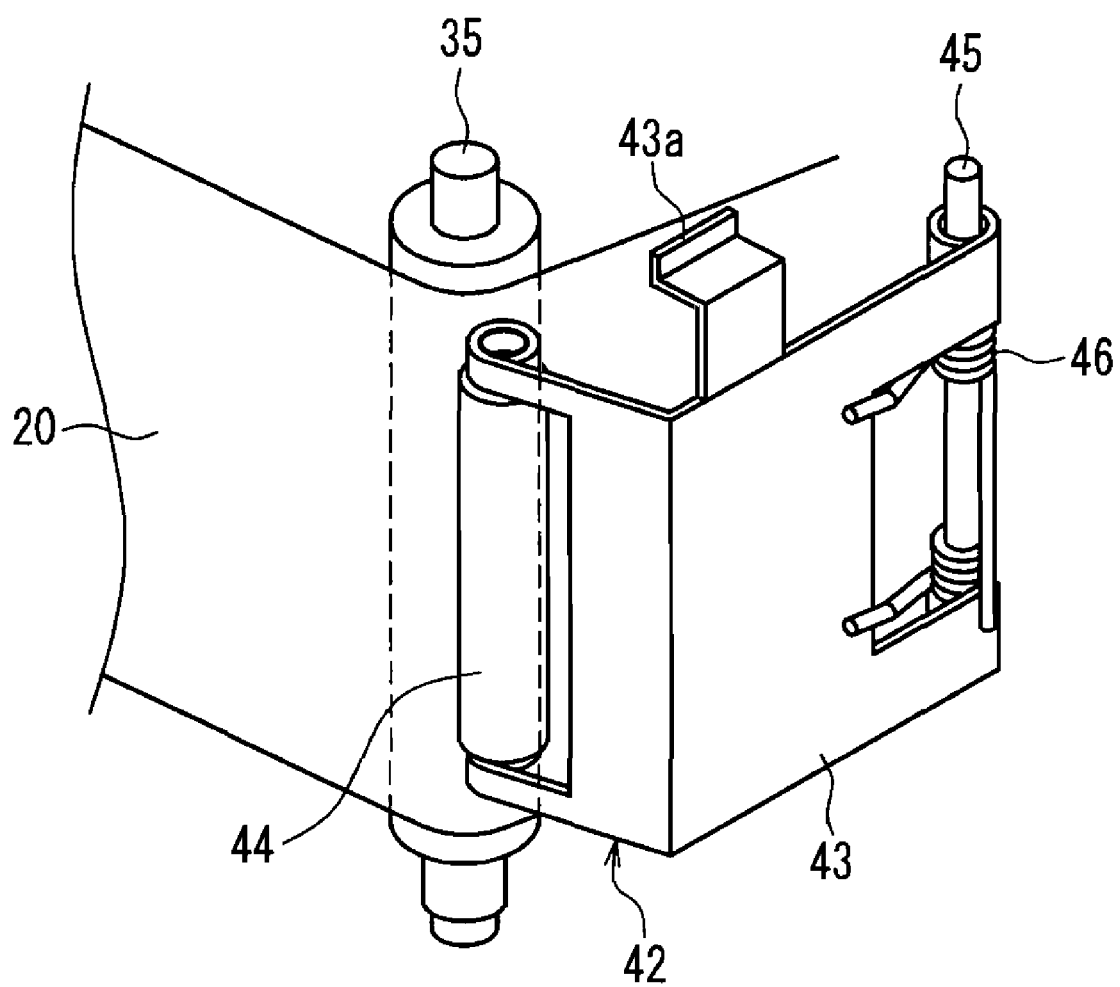
FIG. 3 is a perspective view showing a filter pressing mechanism that constitutes part of a filter feed amount detection unit in the projection type image display device.

As shown in FIG. 3, the filter pressing mechanism 42 functions so as to press the electrostatic filter 20 against the feed amount monitor shaft 35, over which the electrostatic filter 20 is running, to cause the electrostatic filter 20 to be in close contact with the feed amount monitor shaft 35. The filter pressing mechanism 42 includes a support part 43 rotatably supported by a pivot 45, one end of which is fixed to the main body housing 17. A rotatable roller 44 is provided at the tip of the support part 43, and the electrostatic filter 20 is pressed by the roller 44. The roller 44 is used for reducing friction with the electrostatic filter 20.

Also, both ends of a bias spring 46 are engaged with the support part 43 via the pivot 45, and a central part of the bias spring 46 is engaged with a fixing part of the main body housing 17 that is not shown. Accordingly, the bias force of the bias spring 46 causes the roller 44 supported by the support part 43 to be pressed against the feed amount monitor shaft 35 via the electrostatic filter 20. In this way, the feed amount monitor shaft 35 rotates when the electrostatic filter 20 is reeled in by the filter take-up shaft 31b.

According to this structure, the feed amount monitor shaft 35 rotates a number of times that always corresponds to the filter feed amount even though the time required to feed the filter a given amount changes a large amount due to the change in the thickness of the electrostatic filter 20 that has been reeled around the filter take-up shaft 31b in the process of reeling in the electrostatic filter 20. The rotation detection unit show in FIG. 4 is based on this structure.

Figure 4:
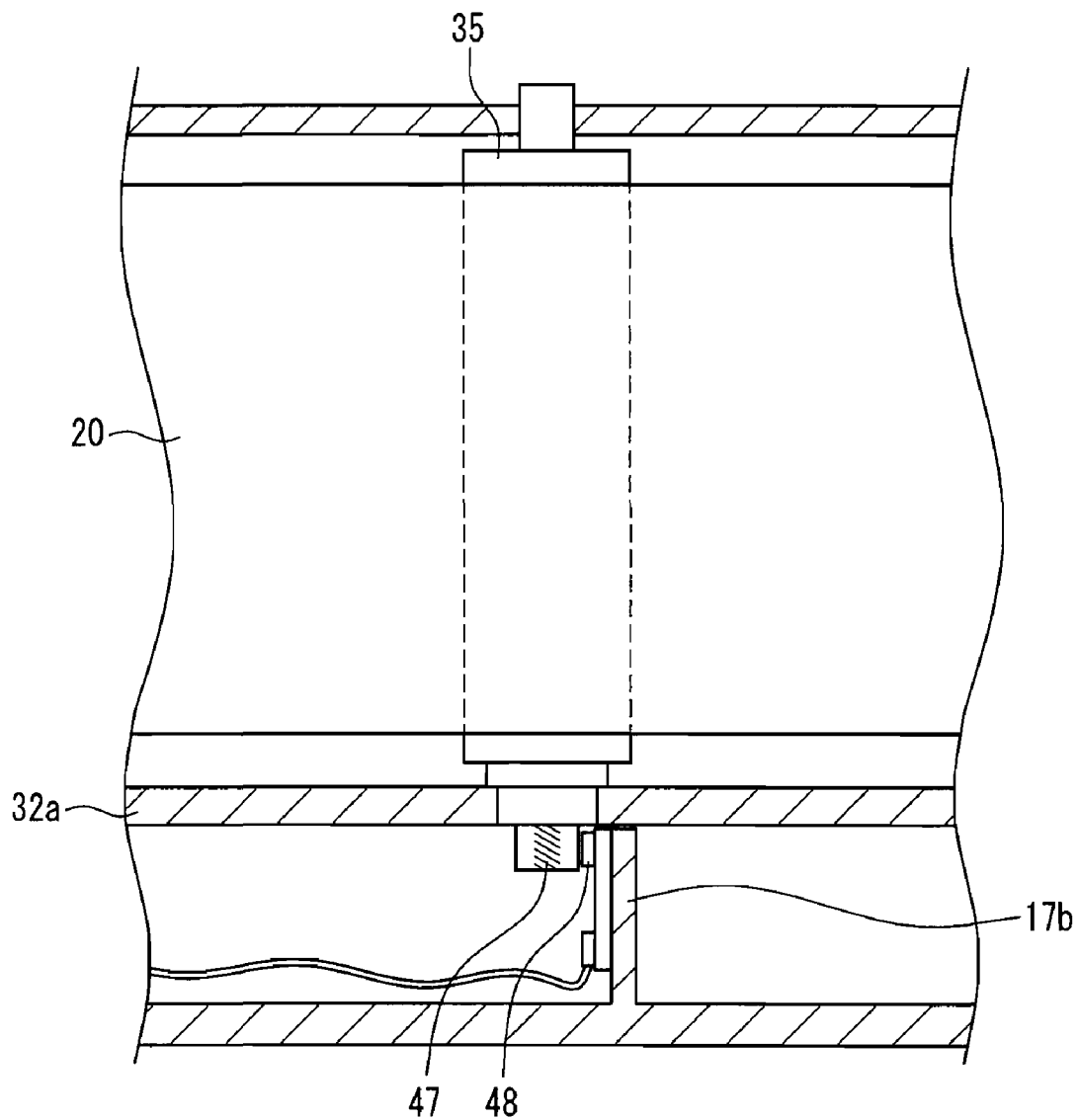
FIG. 4 is a sectional view showing a rotation detection unit that constitutes part of the filter feed amount detection unit in the projection type image display device.

The rotation detection unit shown in FIG. 4 is constituted from the combination of a rotation detection reflection pattern 47 and a pattern detection sensor 48. The rotation detection reflection pattern 47 is provided on a lateral face of an end part of the feed amount monitor shaft 35 that protrudes out of a bottom part 32a of the small housing 32. The pattern detection sensor 48 is fixed to a protruding wall 17b formed as part of the main body housing 17, at a position opposing the rotation detection reflection pattern 47. This enables an amount that the electrostatic filter 20 has been fed to be detected, according to pattern detection output from the pattern detection sensor 48.

Causing a detection signal from the pattern detection sensor 48, the stepping motor 41 and a timer included in the control circuit to work in cooperation enables always feeding and reeling in the electrostatic filter 20 an appropriate predetermined amount each time a predetermined operation time has elapsed.

Although the initial dust-collecting performance of electrostatic filters is high, when a large amount of powder dust has become attached, the dust-collecting capability declines rapidly, and also the air permeability deteriorates and the pressure loss increases, thereby causing a decline in cooling performance, which is a problem. In contrast, according to the present embodiment, appropriate reeling control is performed even in extended use, thereby enabling automatic maintaining of high dust-collecting performance.

The small housing 32 of the filter cassette 30 is provided so as to be removable from the device main body. Due to the filter cassette 30 including the coupling unit for coupling with the filter feeding mechanism as described above, power is transmitted from the device main body to the filter cassette 30. Accordingly, the filter take-up shaft 31*b* included in the filter cassette 30 rotates and the electrostatic filter 20 is transported. There are cases in which, due to the use of an electrostatic filter having a large thickness, only a small initial reeling roll amount can be ensured, or a sufficient capacity for storing a required amount of filter in a rolled condition cannot be ensured, and in such cases, there is a possibility of using up the filter. In such this case, the above structure enables dust-collecting performance to be restored easily by replacing the used filter cassette 30 with a separate filter cassette 30 including a new filter.

Figure 5A:
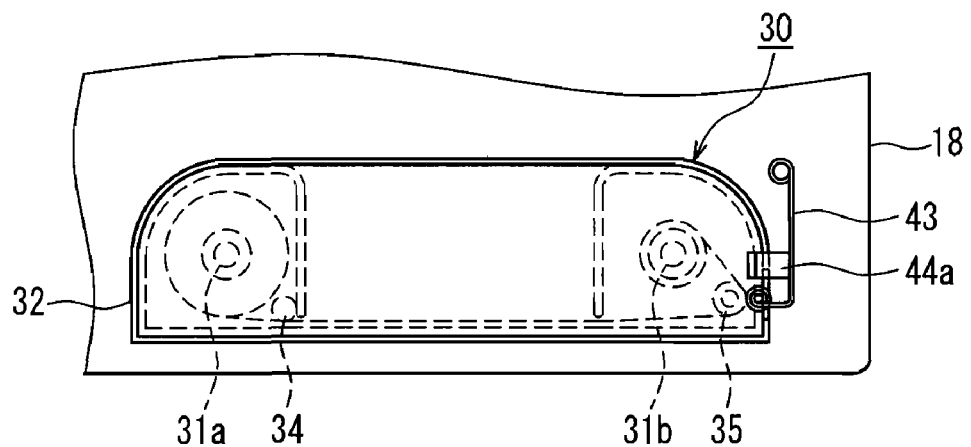
FIG. 5A is a plan view showing a mounted condition of a filter cassette in the projection type image display device.
Figure 5B:
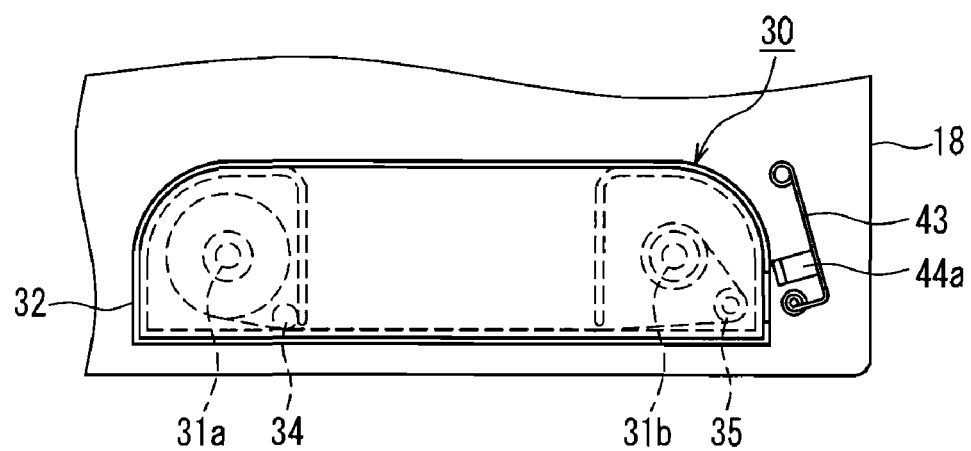
FIG. 5B is a plan view showing another condition of the filter cassette.

At a time of replacing the filter cassette 30, there is a possibility of the filter cassette 30 slipping or falling out depending on the installation condition of the device main body, and therefore in the present embodiment, an arm part 43*a* extending out from the support part 43 is provided as shown in FIG. 3. As shown in FIG. 5A, which shows a plan view of a mounted condition of the filter cassette 30, the arm part 43*a* overlaps with the small housing 32, as seen in the plan view, when the filter cassette 30 is mounted. Accordingly, the arm part 43*a* functions as a stopper and is structured so as to prevent the filter cassette 30 from easily slipping or falling. At a time of replacement, as shown in FIG. 5B, the small housing 32 can be removed by turning the arm part 43*a* to avoid the overlap with the filter cassette 32. At the same time, separating the pressing device 42 that presses on the feed amount monitor shaft 35 enables the pressure to be cancelled. This provides two functions without increasing the number of parts.

A storage part for storing the filter take-up shaft 31*b* in the small housing 32 has an airtight structure except for the filter winding opening and enables the leakage of powder dust stored at a time of operation to be prevented and working without powder dust scattering at a time of replacement as well.

Also, if there is a possibility of emanation of fibers that constitute the electrostatic filter 20, a fiber emanation prevention net 49 can be provided in a proximity of the exhaust side of the electrostatic filter 20 in the small housing 32 (see FIG. 1). In this case, the apertures of the mesh are desirably 1 mm or less. If there is no emanation of fibers from the electrostatic filter 20, the fiber emanation prevention net 49 does not need to be provided.

Note that although liquid crystal panels are used as examples of the image display elements in the present embodiment, the same structure can be used and the same effects can be obtained even in a case of a DLP system using a DMD element.

Also, the air intake fan is not limited with respect to type or number, and may have any structure as long as a suitable amount of air can be drawn in and blown out.

Although an example of using the pattern detection sensor 48 to detect the rotation of the feed amount monitor shaft 35 is described in the present embodiment, the use of, for example, another type of optical sensor or a rotation sensor that mechanically detects the number of rotations is also possible.

Instead of the stepping motor described above, a more inexpensive motor can be employed as the motor used in the filter feeding mechanism. However, an appropriate decelerating system is necessary to conform to the number of rotations.

Embodiment 2

Figure 6:
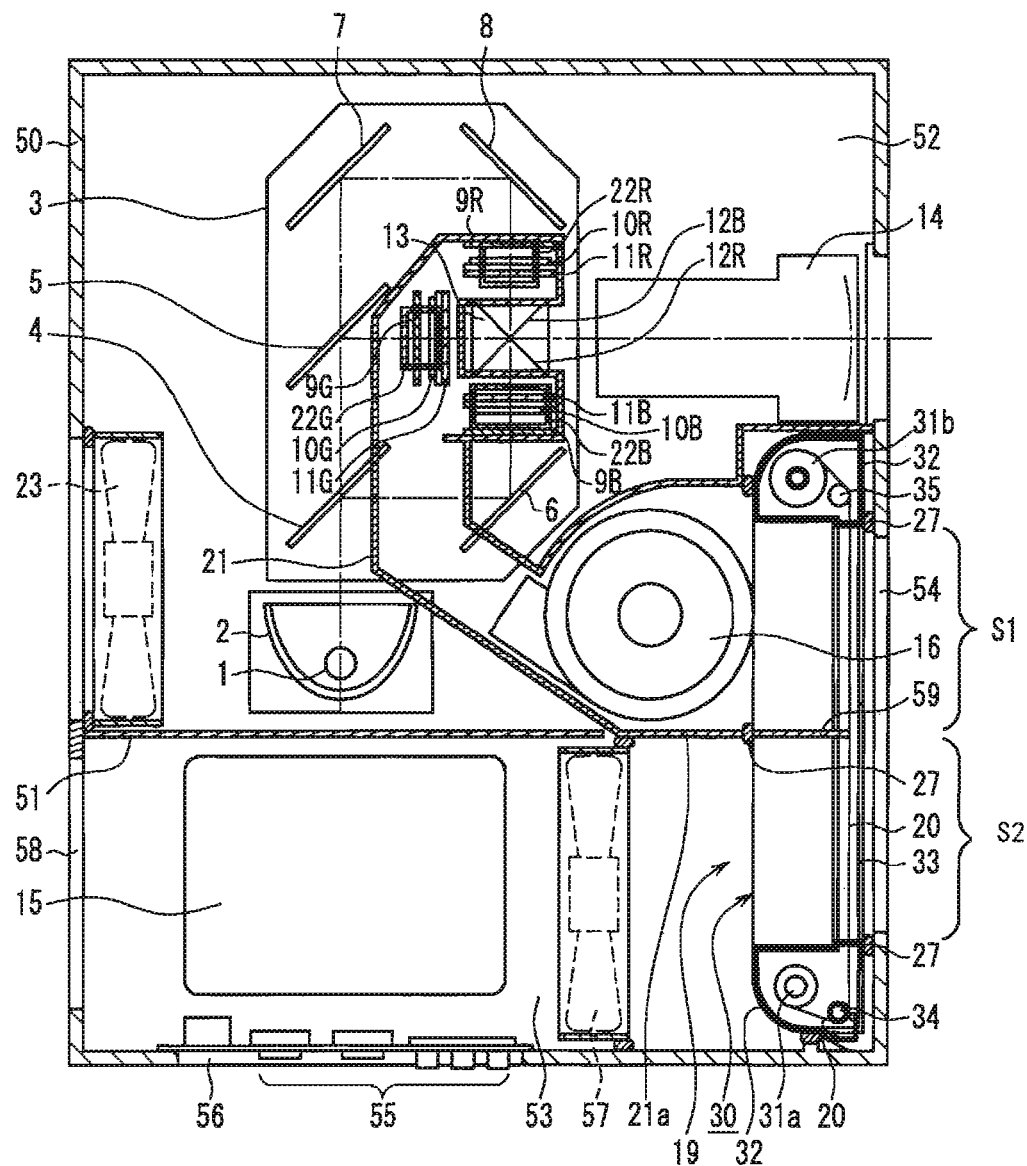
FIG. 6 is a sectional view showing a structure of a projection type image display device in Embodiment 2 of the present invention.

FIG. 6 shows an overall structure of a projection type image display device in Embodiment 2 of the present invention. In FIG. 6, an entirety of the constituent elements is stored in a main body housing 50, the interior of which is divided into a first compartment 52 and a second compartment 53 by a barrier wall 51.

An optical device and a light source are stored in the first compartment 52. The structures of the light source 1, the reflection mirror 2, the optical unit 3, the projection lens 14, etc. are the same as in Embodiment 1, the same reference signs are given to elements that are the same, and repeated descriptions thereof are omitted.

Similarly to Embodiment 1, in the first compartment 52, the air intake fan 16 draws in air from an air intake 54 formed in the main body housing 50, in order to cool the interior of the projection type image display device. Then, the air is guided by the optical unit duct 21 provided below the optical unit 3 and emitted out from the aperture for blue channel 22B, aperture for green channel 22G and aperture for red channel 22R, thereby performing cooling, with focus on the periphery of the liquid crystal panels.

In this structure, a wall face 21*a* of the optical unit duct 21 separates the first compartment 52 and second compartment 53 along with the barrier wall 51, and is used as a partition wall for obstructing the flow of air. Also, the exhaust fan 23 is provided in order to expel air warmed by heat in the first compartment 52 to the outside. In this way, the air drawn in by the air intake fan 16 flows to the apertures 22R, 22G and 22B, the optical unit 3, the light source 1, and the exhaust fan 23 in the stated order, and devices on the air path are cooled.

On the other hand, a signal processing circuit and the power source unit 15 for the light source are placed in the second compartment 53. The power source unit 15 self-generates a substantial amount of heat and breaks down due to the self-generated heat unless cooling is performed. For this reason, a part that reaches a high temperature generally has a structure in which cooling is performed in combination with a heat sink (not shown). Here, although heat dissipation performance deteriorates due to the accumulation of dust on the heat sink etc., which may lead to a deterioration in reliability, the influence of the attachment of dust on the heat sink is small compared to that on the light source 1 and optical unit 3. Accordingly, compared with the first compartment 52, there is less need to give consideration to the intake of dust in the air, and a structure that avoids the intake of dust is merely desirable.

Also, input/output terminals 55 and a power supply unit 56 are provided on a wall face forming the second compartment 53 in order to receive a supply of a video signal for forming a projection image. The input/output terminals 55 and power supply unit 56 are constituted from general parts, and the intake of dust from these parts cannot readily be avoided since sufficient consideration was not given to dust resistance for these parts. For this reason, these parts are provided in the second compartment 53 that is relatively not readily influenced by dust.

Provided in the second compartment 53 is an air intake fan 57 that draws in air and blows the air onto the power source unit 15. In the present embodiment, air that has taken heat away from the power source unit 15 etc. is emitted out from an exhaust 58. However, substantially the same cooling can be performed even if an exhaust fan is disposed in the exhaust 58, instead of providing the air intake fan 57.

The powder dust capture unit 19 is provided between the air intake 54 and air intake fans 16 and 57 in the main body housing 50, and the buffer materials 27 that do not allow air to pass are provided at a plurality of locations between the air intake 54 and powder dust capture unit 19, so as to prevent air from leaking through gaps.

The structure of the powder dust capture unit 19 is substantially the same as in Embodiment 1. However, in the present embodiment, the powder dust capture unit 19 is disposed in the air intake 54 that is formed so as to extend over the first compartment 52 and second compartment 53. Accordingly, in the small housing 32, the aperture part 33 is formed so as to allow air from the air intake 54 to pass between the rolling shaft 31a and filter take-up shaft 31b, and furthermore, the small housing 32 includes a partition wall 59 that is continuously connected to the wall face 21a of the optical unit duct 21 in order to partition the air that passes through the electrostatic filter 20 and is drawn into the first compartment 52 and second compartment 53.

Other structures and operations of the powder dust capture unit 19, as well as effects based thereon are the same as in Embodiment 1. Furthermore, according to the present embodiment, the powder dust elimination effect of the powder dust capture unit 19 is used in both the first compartment 52 that stores elements that are readily influenced by powder dust and the second compartment that stores elements that are not readily influenced by powder dust. Accordingly, internal devices such as the light source and power source are cooled sufficiently without increasing the filter storage capacity, and furthermore, the time until filter replacement can be extended, while preventing the attachment of powder dust in a periphery of the image display elements and light source. Below is a more detailed description.

As described above, the aperture area formed by the aperture part 33 of the small housing 32 with respect to the electrostatic filter 20 is partitioned at a predetermined ratio by the partition wall 59. FIG. 6 shows an example in which the partition wall 59 is provided at a position that partitions the aperture area at a ratio of 1/2. According to the partition wall 59, when the rolled-up electrostatic filter is only fed ½ the width of the aperture part 33, air that passes through the new part of the filter is guided to the first compartment 52. Also, air that passes through the previously used part of the electrostatic filter 20 is guided to the second compartment 53.

In other words, according to control of the powder dust capture unit 19, when the amount of filter that is fed in a single time is smaller than the surface area of the aperture part 33 (in this case, ½), the air guided to the first compartment 52 includes less dust than the air guided to the second compartment 53, due to the difference in the dust-collecting performance of the electrostatic filter 20.

Although the electrostatic filter can be used for a long period by using of a long filter that is reeled in, since the air cannot be cleaned when the powder dust capture capability has been exceeded due to the accumulation of powder dust, a portion in which the powder dust capture capability has fallen may be considered to be used up after a predetermined usage time has passed, and it is necessary for this portion to be refreshed with a new portion. On the other hand, since the usage time is determined according to the length of the electrostatic filter and the length of the opposing aperture in the device, reducing the number of times that the filter is replaced requires lengthening the filter and increasing the storage space.

In contrast, the above-described structure of the present embodiment enables reduction of the refreshed surface area of the electrostatic filter 20 with respect to the aperture part 33, thereby enabling substantially extending the usage time, that is to say the lifetime of the electrostatic filter 20.

The relationship between a surface area S1 of the electrostatic filter 20 that transmits air to be guided to the first compartment 52 and a surface area S2 that transmits air to be guided to the second compartment 53 is preferably set as shown below.

$$S1 \geq S2$$

This is because S2 can be set smaller, to the extent that no practical problems arise, due to the fact that an insufficient amount of air for cooling can be compensated by raising the blowing capability of the air intake fan 57, and the fact that although the powder collecting capability falls when the speed of the passing air increases, parts that are relatively resistant to dust are stored in the second compartment 53. This enables the size of the aperture part 33 to be reduced to a minimum, thereby facilitating a reduction in size and cost of the overall device.

Particularly, if the aperture surface area of the first compartment 52 is an integral multiple of the aperture surface area of the second compartment 53, a single time operation of feed for refreshing a part of the former causes the entire face of the latter to be refreshed. Since the part of the filter covering the aperture leading to the second compartment 53 has been used as the filter covering the aperture leading to the first compartment 52, the dust-collecting performance is considered to have deteriorated in this part. However, performing the above causes the entire face to be refreshed at one time, thereby enabling the deterioration to be suppressed to a minimum.

Embodiment 3

Figure 7:
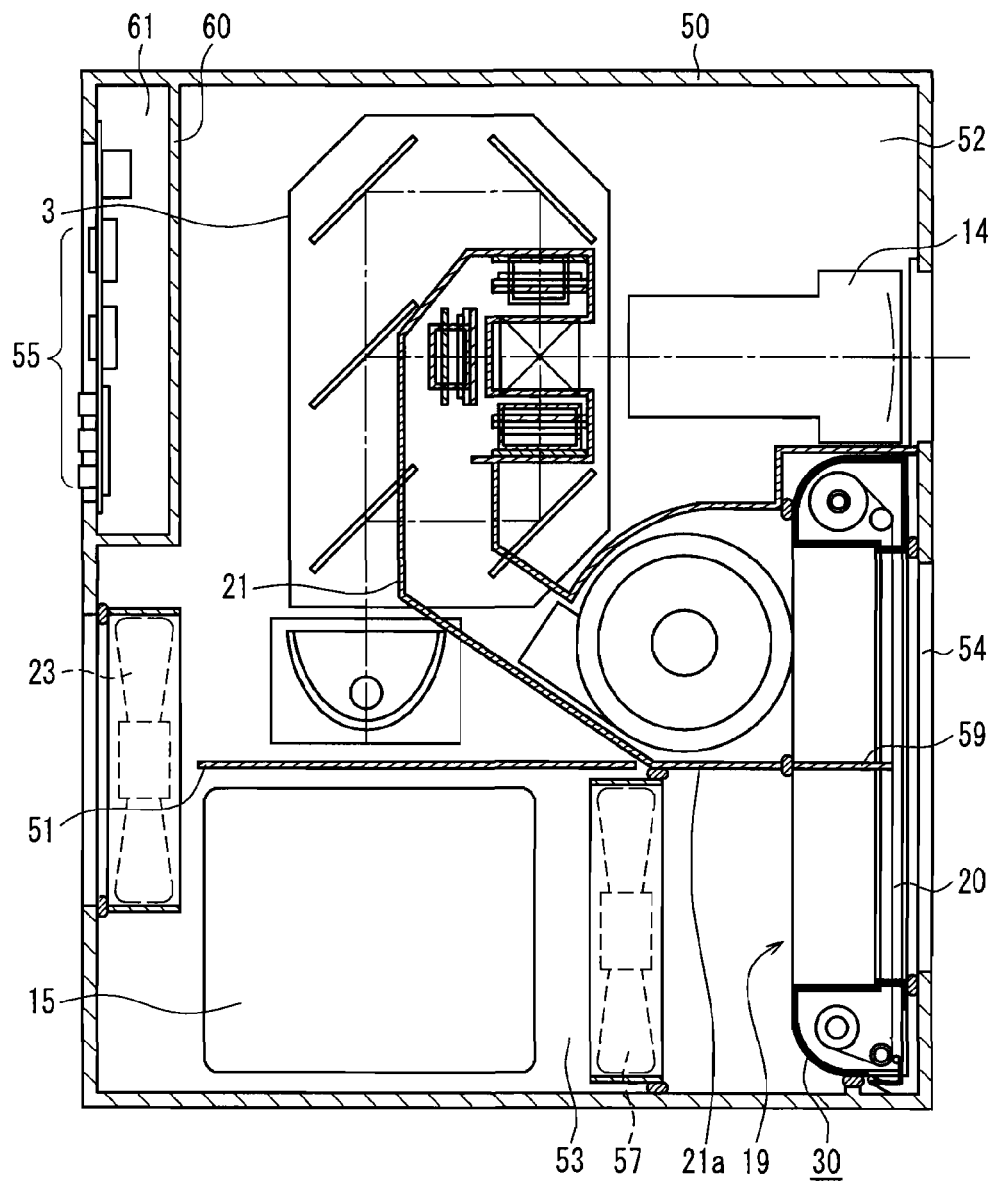
FIG. 7 is a sectional view showing a structure of a projection type image display device in Embodiment 3 of the present invention.

FIG. 7 shows an overall structure of a projection type image display device in Embodiment 3 of the present invention. In FIG. 7, elements that are the same as in Embodiment 2 shown in FIG. 6 are given the same numbers, and repeated descriptions thereof are omitted.

Although the input/output terminals 55 and the power supply unit 56 are provided in the wall face forming the second compartment 53 in Embodiment 2, cooling of the input/output terminals 55 and power supply unit 56 is not necessarily required. Accordingly, in the present embodiment, a third compartment 61 partitioned by a wall face 60 is provided as a separate area, and the above parts are stored in this area. This enables more effective cooling of the interior of the first compartment 52.

Also, this structure obtains effects such as noise not readily being generated since the distance from the image display elements is shortened, and the electrical wiring being simplified.

Also, if the exhaust capability of the exhaust fan 23 is sufficient, the exhaust fan can be shared between the first compartment 52 and second compartment 53 as shown in FIG. 7. In this way, instead of providing the air intake fan 57 and exhaust fan 23 upstream and downstream of the power source unit 15 respectively in the second compartment 53, providing only the air intake fan 57 or only the exhaust fan 23 is possible. Generally, disposing the power source unit 15 downstream is considered to be advantageous to reducing the size and cost of the overall set since local cooling is easy.

Also, although the above embodiments describe examples of a two-body type image display device in which a screen for displaying a projection image is not included in the projection type image display device main body, the structures of the above embodiments are applicable even in the case of a single-body type. In this case, although the projection area from the projection lens to the screen increases, this area does not require cooling and is desirably a room that is sealed airtight separately from the first compartment and second compartment.

Industrial Applicability

In a powder dust capture device according to the present invention, even minute powder dust can be removed by an electrostatic filter, and even when used for a long time, the filter is automatically refreshed as appropriate, thereby constantly keeping the filter in a favorable condition, which enables maintaining powder dust removal performance for a long time without causing maintenance management to be troublesome. The powder dust capture device is particularly useful in projection type image display devices, which often are mounted in high places in a case of ceiling-mounted use.

The invention claimed is:

1. A powder dust capture device comprising:
a main body housing having an air intake and an exhaust;
a powder dust capture unit provided in the air intake; and
a blowing unit for drawing air in from the air intake via the powder dust capture unit, passing the air through a predetermined area in the main body housing, and expelling the air out from the exhaust,
the powder dust capture unit comprising a filter unit, a filter feeding mechanism and a filter feed control unit, and
the filter unit comprising an electrostatic filter wound around a rolling shaft, a filter take-up shaft that reels in the electrostatic filter, a coupling unit for engaging the filter take-up shaft to the filter feeding mechanism, and a small housing that stores the electrostatic filter wound around the rolling shaft and the filter take-up shaft,
wherein the small housing has an aperture part between the rolling shaft and the filter take-up shaft for drawing in air that has passed through the electrostatic filter from the air intake,
the filter feeding mechanism can perform driving to rotate the filter take-up shaft via coupling with the filter take-up shaft by engagement with the coupling unit,
the filter feed control unit has a filter feed amount detection unit and controls a filter feeding operation performed by the filter feeding mechanism, based on detection output from the filter feed amount detection unit, and
the filter unit is attachable/removable with respect to the main body housing.

2. The powder dust capture device of claim 1,
wherein the filter feed control unit controls the filter feeding operation performed by the filter feeding mechanism so that a part of the electrostatic filter that is exposed to the aperture part is partially refreshed.

3. The powder dust capture device of claim 1,
wherein the small housing has an airtight structure that shields the filter take-up shaft from the outside.

4. The powder dust capture device of claim 1,
wherein a fiber emanation prevention net is affixed in a proximity of an exhaust side of the electrostatic filter.

5. The powder dust capture device of claim 4,
wherein an aperture of a mesh in the fiber emanation prevention net is less than or equal to 1 mm.

6. The powder dust capture device of claim 1,
wherein the filter feed amount detection unit comprises a feed amount monitor shaft that is rotated by running of the electrostatic filter at a time of reeling by the filter take-up shaft, and a pressing device that presses the electrostatic filter against the feed amount monitor shaft, and
the feed amount monitor shaft rotates in correspondence with a feed amount of the electrostatic filter.

7. The powder dust capture device of claim 6,
wherein a detection pattern is provided on the feed amount monitor shaft for performing detection of rotation of the feed amount monitor shaft.

8. The powder dust capture device of claim 7,
wherein the filter feed amount detection unit comprises a rotation amount sensor that reads the detection pattern provided on the feed amount monitor shaft and detects a rotation amount of the feed amount monitor shaft.

9. The powder dust capture device of claim 1,
wherein in the filter feeding mechanism, the coupling unit is coupled with the filter take-up shaft by mounting of the filter unit to the main body housing.

10. The powder dust capture device of claim 6,
wherein the pressing device is provided on a main body housing side, and
the pressing device comprises an arm unit extending in a direction that regulates removal of the small housing, so that the small housing does not detach from the main body housing at a time of pressing the electrostatic filter against the feed amount monitor shaft.

11. The powder dust capture device of claim 1,
wherein the filter feed control unit controls the filter feeding mechanism so that the electrostatic filter is caused to be fed a given amount at a predetermined usage time interval.

12. A projection type image display device comprising:
a light source;
an image display element that modulates incident light;
a projection optical system that causes light from the light source to incident on the image display element and projects an image obtained by the modulation performed by the image display element;
a power source unit;
a main body housing storing the light source, the image display element, the projection optical system, and the power source unit, and having an air intake and an exhaust;
a powder dust capture unit provided in the air intake; and
a blowing unit for drawing air in from the air intake via the powder dust capture unit, passing the air through a predetermined area in the main body housing, and expelling the air out from the exhaust,
the powder dust capture unit comprising a filter unit, a filter feeding mechanism and a filter feed control unit, and
the filter unit comprising an electrostatic filter wound around a rolling shaft, a filter take-up shaft that reels in the electrostatic filter, a coupling unit for engaging the filter take-up shaft to the filter feeding mechanism, and a small housing that stores the electrostatic filter wound around the rolling shaft and the filter take-up shaft,
wherein the small housing has an aperture part between the rolling shaft and the filter take-up shaft for drawing in air that has passed through the electrostatic filter from the air intake,
the filter feeding mechanism can perform driving to rotate the filter take-up shaft via coupling with the filter take-up shaft by engagement with the coupling unit,
the filter feed control unit has a filter feed amount detection unit and controls a filter feeding operation performed by the filter feeding mechanism, based on detection output from the filter feed amount detection unit, and
the filter unit is attachable/removable with respect to the main body housing.

13. The projection type image display device of claim 12,
wherein the filter feed control unit controls the filter feeding operation performed by the filter feeding mechanism so that a part of the electrostatic filter that is exposed to the aperture part is partially refreshed.

14. The projection type image display device of claim 12, a sealing material that does not allow air to pass is provided between the air intake of the main body housing and the powder dust capture unit, thus forming an airtight structure.

15. The projection type image display device of claim 12, further comprising:
in the main body housing, an inner wall that sections the internal space of the main body housing into a first compartment that stores at least the light source and the image display element and a second compartment that stores at least the power source unit,
wherein in a part of the electrostatic filter that is exposed to the aperture part, air that passes through the rolling shaft side of the electrostatic filter is guided to the first compartment, and air that passes through the filter take-up shaft side of the electrostatic filter is guided to the second compartment.

16. The projection type image display device of claim 12, wherein a storage unit that stores the electrostatic filter in the small housing has an airtight structure with respect to the outside.

17. The projection type image display device of claim 12, wherein an amount which the electrostatic filter is fed at a single time operation is smaller than an aperture width for transmitting air to be guided to the first compartment.

18. The projection type image display device of claim 17, wherein in a surface area of the electrostatic filter that is exposed to the aperture part, a surface area S1 for transmitting air to be guided to the first compartment and a surface area S2 for transmitting air to be guided to the second compartment are set so as to satisfy a relationship $S1 \geq S2$.

19. The projection type image display device of claim 12, air that has passed through the filter and is to be guided to the first compartment and air that has passed through the filter and is to be guided to the second compartment is respectively guided by separate exhaust fans.

20. The projection type image display device of claim 12, further comprising an input/output terminal and a power source input unit,
wherein the input/output terminal and the power source input unit are provided in the second compartment.

21. The projection type image display device of claim 20, wherein the input/output terminal and the power source input unit are stored in a third compartment that is provided separately from the first compartment and the second compartment.

22. The projection type image display device of claim 12, further comprising an exhaust fan shared between the first compartment and the second compartment.

* * * * *